July 28, 1931.  E. B. TRUSLER  1,816,552
GEAR TIMING SYSTEM
Filed March 11, 1929
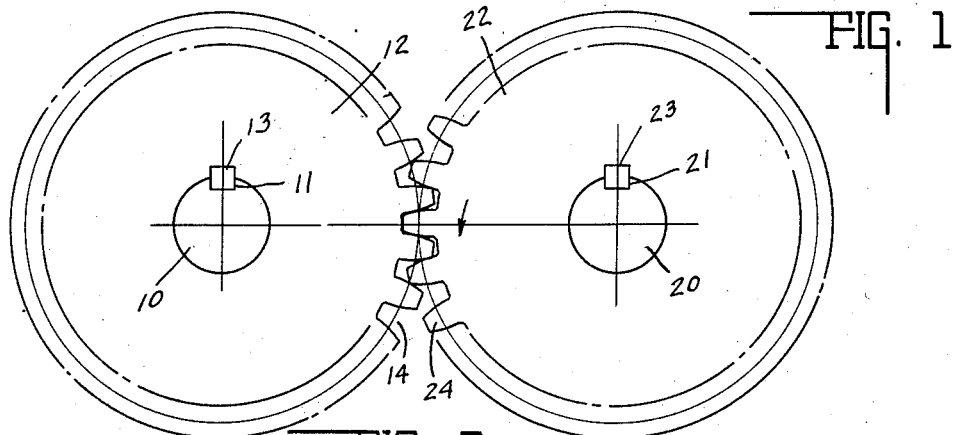
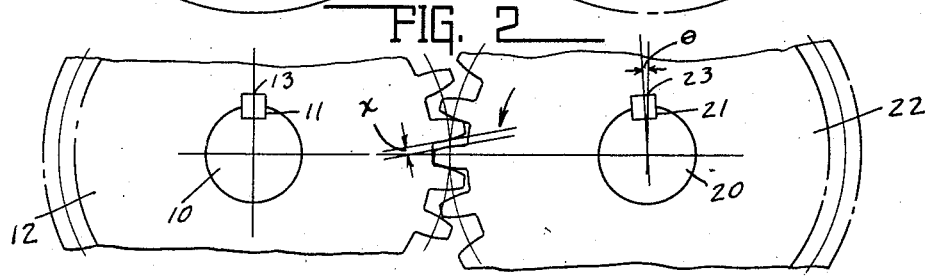
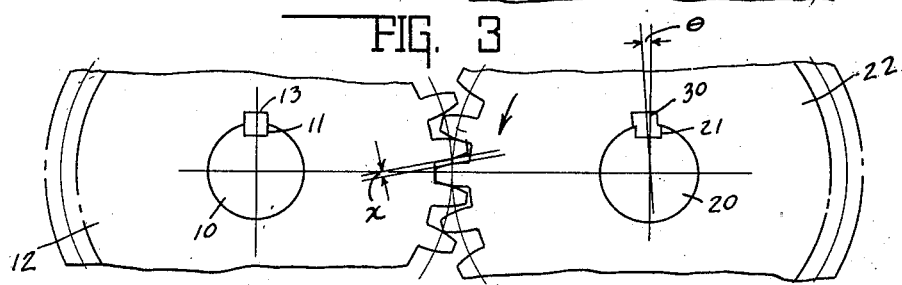
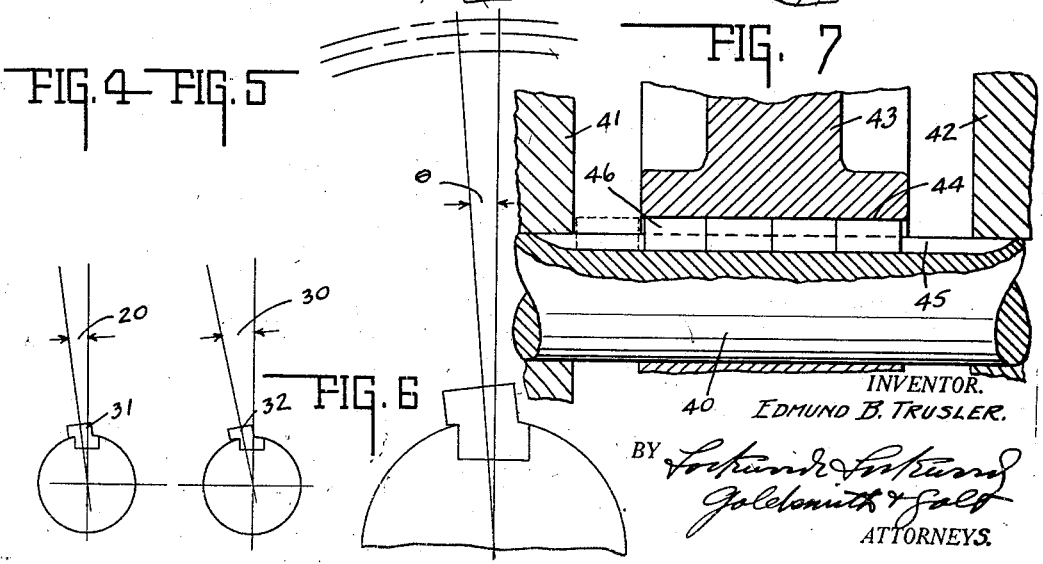
INVENTOR.
EDMUND B. TRUSLER.
BY
ATTORNEYS.

Patented July 28, 1931

1,816,552

UNITED STATES PATENT OFFICE

EDMUND B. TRUSLER, OF CONNERSVILLE, INDIANA

GEAR TIMING SYSTEM

Application filed March 11, 1929. Serial No. 345,907.

This invention relates to a system of keying a gear on its shaft or mounting.

The chief object of this invention is to compensate for the wearing of mating teeth and the like so that the timing between the shafts may be maintained substantially at a predetermined relation.

The means for maintaining the shafts in predetermined timed relation substantially independent of the tooth wear consists in providing for the shaft and gear a series of keys of offset differences progressively increasing in amount, and also in forming the keys of a predetermined length or multiple unit thereof for a purpose hereinafter to be set forth.

The full nature of the invention will be understood from the accompanying drawings and the following description and claim.

In the drawings, Fig. 1 is a side elevation of a pair of standard spur gears, the supporting shafts of which are parallel and parts are illustrated without any wear or back lash.

Fig. 2 is a similar view of the same parts with the mating gears slightly worn and the angular displacement from the predetermined timing being indicated by the angle theta ($\theta$).

Fig. 3 is a similar view showing one of the worn gears advanced an amount equal to substantially that of the wear, such advance being similarly indicated by the angle theta ($\theta$) and such angular displacement being obtained by an offset key.

Fig. 4 is a similar view of a shaft and offset key, the offsetting being substantially twice that of the key shown in Fig. 3, the shaft having the same diameter.

Fig. 5 is a similar view showing an offset key arrangement wherein the displacement is three times that shown in Fig. 3, the shaft having the same diameter.

Fig. 6 is a similar view showing a larger key for a larger diameter shaft and gear and wherein the angular displacement is equal to that shown in Fig. 3 but the peripheral displacement varies directly as the radii.

Fig. 7 is a tranverse sectional view through a shaft and bearing connection with a gear keyed thereto by a plurality of unit length keys.

In the drawings, 10 indicates a shaft and 20 a similar and parallel shaft. Each includes a key way 11 and 21 respectively, which keys the gear 12 and 22 respectively thereto, each gear having the mating slots 13 and 23 respectively. The gears have teeth 14 and 24 respectively that mesh with each other. As shown in Fig. 1, the key slots are in corresponding positions and the teeth mesh or mate with each other without backlash or without any wear.

In Fig. 2, there is illustrated a condition of the same construction as shown in Fig. 1, but in this instance when the shaft 10, carrying gear 12 is in the position shown in Fig. 2, at that instant, due to the wear between the gearing, gear 22 is displaced by the angle theta ($\theta$) as indicated from the position that the gear had initially as shown in Fig. 1. The key does not wear appreciably and neither do the slots, but the gearing does. If it is essential that a certain time relationship or predetermined positioning or predetermined relationship shall exist between the shafts 10 and 20 for the successful operation of some complicated machine, then means must be provided for maintaining such timed relationship and herein, rather than provide new gearing, a system of offset keying is proposed to correct for the departure from that relationship.

As shown in Fig. 2, the displacement is equal to the angle theta ($\theta$) when the initial key is retained and when the gears have worn a peripheral amount corresponding to the peripheral distance chi (X).

In Fig. 3, the gear has been displaced, or rather advanced, so as to compensate for the peripheral wear X and when this has occurred, the shaft 20 is in exactly the same timed relation as it was in Fig. 1 with the shaft 10. The interconnected mechanisms, whatever they may be, other than the gearing, therefore, have the same time sequence operation as initially provided.

As additional wear takes place, the offset key 30 shown in Fig. 3 is removed and an offset key 31 is substituted therefor, which again advances the gear 22 an additional amount. Such peripheral advance chi (X) may be an additional thousandth of an inch. A system of keys such as 30, 31 and 32 may be provided,—the latter providing for three times the initial displacement taken care of by the key 30.

In Fig. 6 an offset key construction for a large shaft diameter is illustrated. The key is increased in size in proportion although the angular displacement is the same as Fig. 3.

The chief feature of the invention therefore, which will be evident from the foregoing, consists in the successively offset key constructions shown in Figs. 3 to 6 inclusive which are adapted to substantially correct for any shaft displacement in the relationship between two shafts wherein predetermined time relationship is substantially required.

In this system of keying, it will be readily apparent from an examination of Fig. 6 that the keys should be made to standard shaft sizes and the angles of displacement or offsetting suitably arranged for the predetermined peripheral displacement. Each key will have a different angle and the sides of each key must be accurately arranged relative to the diameter of the shaft and the angularity of the displacement. This is required because otherwise there will not be the proper key bearing between the shaft, key and gear. Without this proper bearing, the gear will be loose upon the offset key so that the invention includes the proper angularity of the sides of the offset key for each key as well as the progressive standard offsetting.

The keys preferably are standardized,—for example, each key can be made approximately one-quarter of the shaft diameter. That is, a two-inch shaft or shaft from one and thirteen-sixteenths inches to two and one-eighth inches can use a half inch square key and the keys can be made in sets of any predetermined number by offsetting a one-thousandth of an inch, two-thousandths, three-thousandths, etc., this arrangement being shown in Figs. 3, 4 and 5. Also, the gear radius divided by the shaft radius gives the ratio between the two, and this multiplied by the offset in thousandths gives the advance at the periphery of chi (X) for the angle theta ($\Theta$) displacement. For example, a one-inch shaft radius and four-inch gear radius would make a four to one ratio and if the key was offset one-thousandth of an inch, the gear at the periphery would be advanced four-thousandths of an inch. Each key on the top face may have its shaft and gear diameter offset and length stamped thereon for ease and certainty of selection.

The advantage of this system of keying when used in machines that must be initially timed and continuously retimed when in use for wear compensation will be apparent from the foregoing. For example, if the timing is out of phase by reason of a twelve-thousandths displacement at the periphery of the gear and the latter has a four to one ratio with the shaft, the key required would be one with an offset of three-thousandths. If the original displacement was seven-thousandths offset, then seven-thousandths plus three-thousandths would make ten-thousandths offset required in the new key for proper timing. Where the amount of offset is appreciable, standard key stock may be replaced by nickel key stock having greater shearing resistance. The offsetting may be in degrees instead of inches.

To further standardize the keying system and to make it universally applicable, there is illustrated in Fig. 7 a shaft 40 having an exposed portion between two bearings 41 and 42. The wheel 43 or the like includes the keyway 44 that mates with the keyway 45 formed in shaft 40. The keys 46 as shown in Fig. 7 are of equal length and are of a length at least slightly less than the distance between the hub portion of the gear 43 and the shaft bearings so that, as shown dotted in Fig. 7, each unit length of key 46 may be individually inserted in the keyway and then driven home until the full width of key is obtained. The keys may be made in unit length, two or three times the same or any multiple thereof. This further reduces the number of keys necessary to completely stock for a keying system sufficient to provide for substantially any keying arrangement.

The invention claimed is:

In combination with a shaft, a pair of spaced bearings, said shaft having an elongated keyway therein extending substantially from bearing to bearing, a rotatable member having a complementary keyway and mounted upon said shaft between said bearings with predetermined longitudinal clearance, and a plurality of identical unit length keys each receivable by both keyways for keying the rotatable member to the shaft and each of a length less than said clearance permitting unit key reception and removal from the keyways.

In witness whereof, I have hereunto affixed my signature.

EDMUND B. TRUSLER.